UNITED STATES PATENT OFFICE.

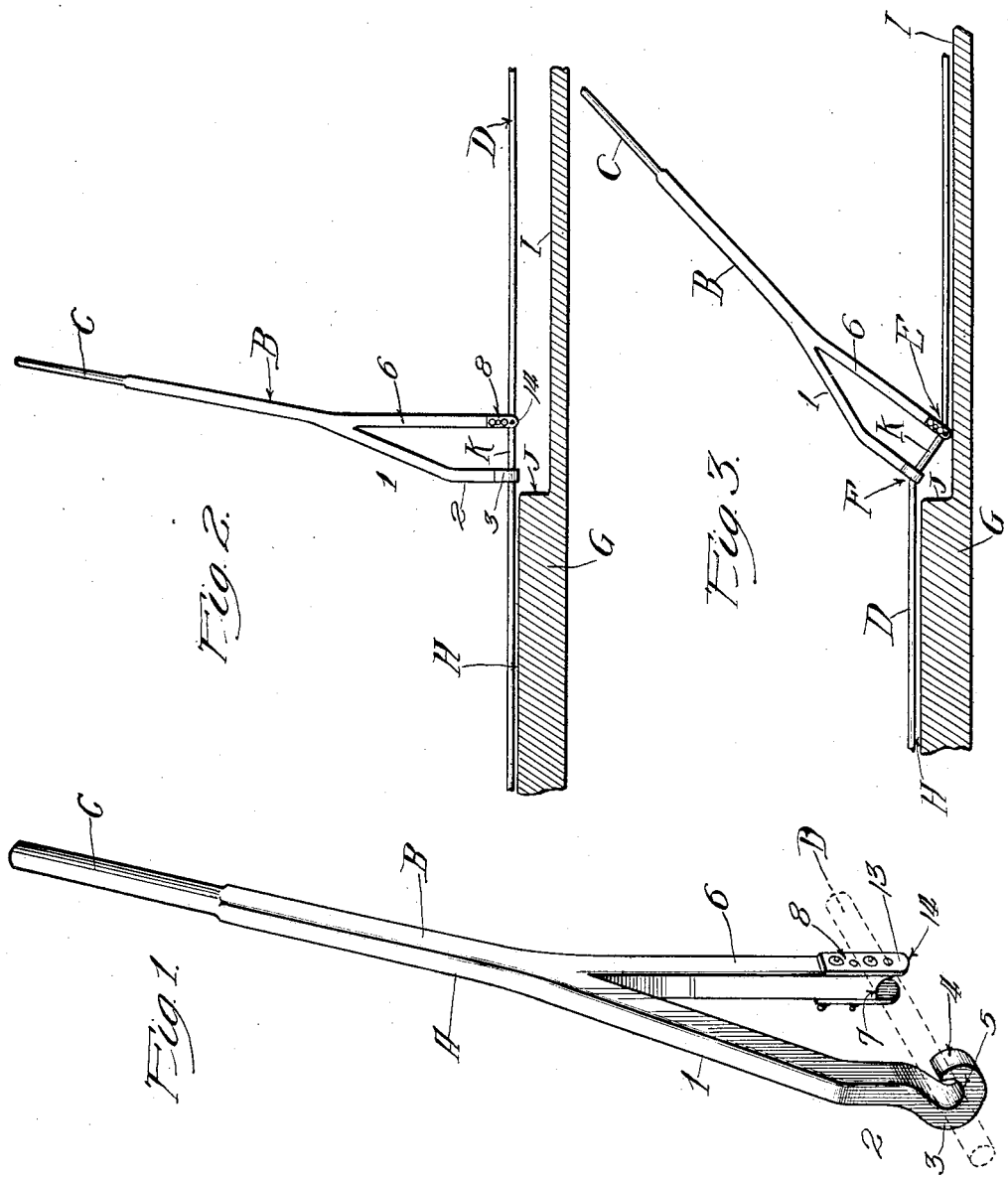

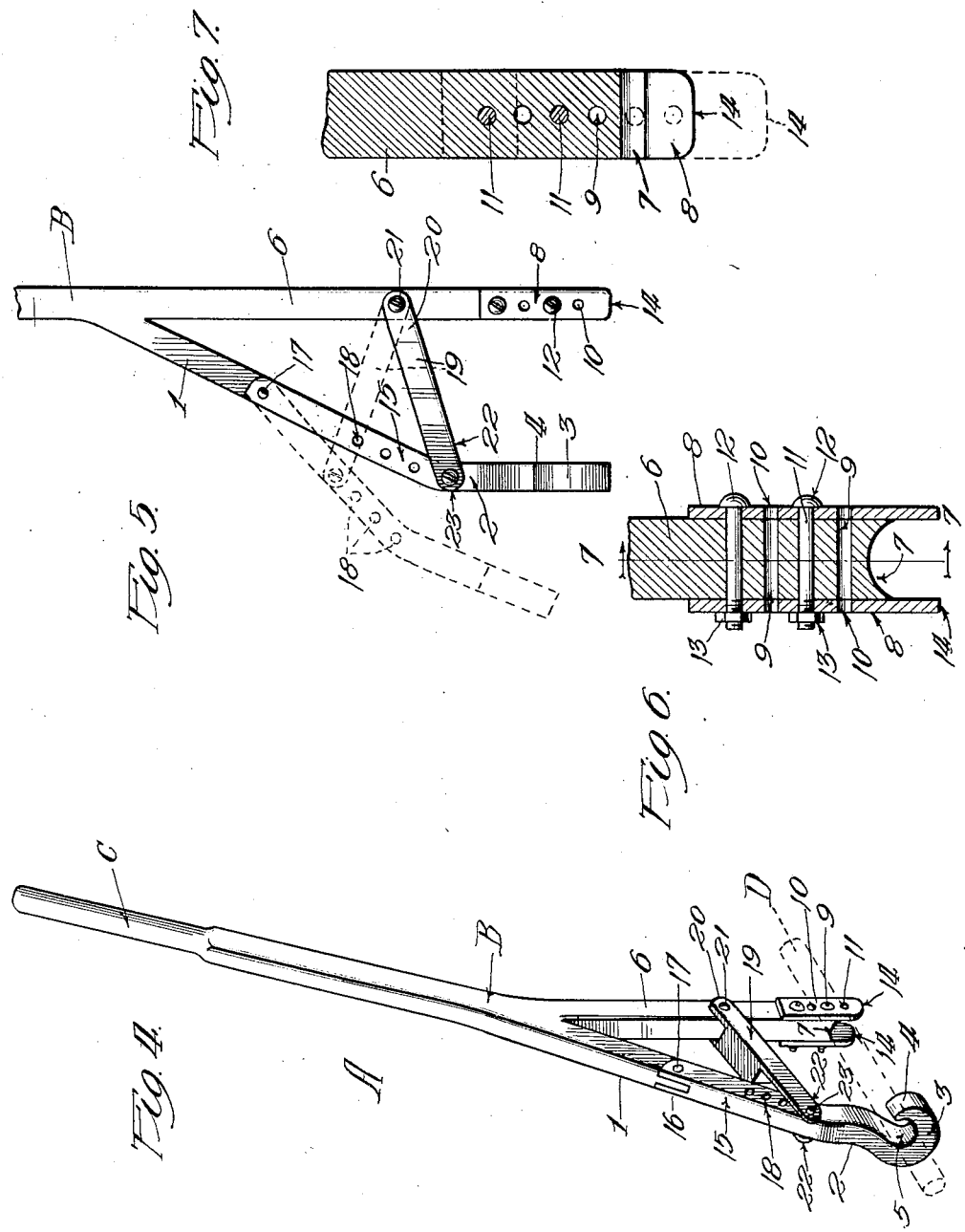

JOHN J. WALT, OF CHICAGO, ILLINOIS.

TOOL FOR BENDING METAL RODS.

1,354,448.  Specification of Letters Patent.  Patented Sept. 28, 1920.

Application filed November 5, 1919. Serial No. 335,903.

*To all whom it may concern:*

Be it known that I, JOHN J. WALT, a citizen of the United States, and a resident of Chicago, in the county of Cook and State of Illinois, have invented certain new and useful Improvements in Tools for Bending Metal Rods; and I do hereby declare that the following is a full, clear, and exact description thereof, reference being had to the accompanying drawings, and to the letters of reference marked thereon, which form a part of this specification.

This invention relates to improvements in tools for bending rods or bars into desired shape for use in reinforced concrete work, and for other uses.

It has for its object a tool which will be more positive in its action than the tools now in use for similar purposes and thus avoids the necessity for special skill in the workmen, in order to reproduce the same degree of flexure or bend in a plurality of such reinforcing bars or rods, thereby enabling the manipulation of such bars or rods with uniform flexures or bends by cheaper labor.

Another object of the invention is to produce a bar which will have certain adjustable features whereby the grip of the tool and its range of application will be greatly increased. Another object is to produce a tool which will be very simple in its construction, not easy to get out of order, and relatively cheap to manufacture.

These and other advantages of the invention will be manifest as I proceed to explain the invention in the following specification.

In the drawings:

Figure 1 illustrates, in a perspective view, a tool constructed in its simplest form, in accordance with my invention.

Fig. 2 illustrates, in a side view, the tool in position upon a reinforcing rod which is about to be bent by the tool.

Fig. 3 is a similar view showing the position of the tool and the rod after the latter has been bent.

Fig. 4 is a perspective view of a modification of a tool embodying my invention, illustrating certain adjustable features.

Fig. 5 is a side view of the lower end of the tool shown in Fig. 4, illustrating by dotted lines the adjustable feature.

Fig. 6 is a vertical sectional view, enlarged, of a part of the tool, taken upon the plane indicated by the line 6—6 of Fig. 5.

Fig. 7 is a transverse, sectional view of the same part, taken upon the plane of the line 7—7 of Fig. 6.

Referring now to the tool illustrated in Fig. 1, A represents the tool as a whole, comprising a lever B terminating in a handle C, at one end, and provided at the lower end with a shank member 1, having in turn at its lower end a downwardly projecting arm portion 2. It will be noticed that the lever and handle, the shank and the downwardly projecting member 2 are all in the same plane in one dimension, but lie at an angle to each other or in different planes in the transverse dimension.

To the lower end of the member 2 is a bar or rod hook gripping member 3, which extends laterally and then downwardly and then upwardly, the end of the hook being indicated at 4; said hook 3 being provided with a seat or recess 5 for the rod to be manipulated by the tool. The said rod is indicated in dotted lines by the letter D.

A fulcrum arm 6 is attached to the tool at a convenient point, preferably about where the shank 1 joins the lower end of the lever B. This fulcrum member 6 lies substantially in the same plane with and parallel in direction to the downwardly projecting member 2, which unites the hook 3 with the shank 1. The lower end of the fulcrum member 6 is shaped at 7 to fit on top of the rod D. That is to say, when in use, as indicated in dotted lines in Fig. 1, the rod D rests in the hook seat 5 and underneath the shaped end 7 of the fulcrum arm 6. To bend the rod D when the tool A is in position on said rod, as shown in Figs. 1 and 2, the workman will press on the handle bar B in a direction to raise the hook 3, carrying with it the rod D. This will cause a bend in the rod D, as indicated at the point E, in Fig. 3. The tool may then be placed on any other portion of the rod D, care being always taken to place the lower end of the fulcrum member 6 over that part of the rod D where the next bend F is to be made.

It is frequently found necessary to shape the reinforcing rod D with more than one bend, so that said rods, when placed in position in the form into which the concrete is to be poured, will lie a predetermined space or distance from the face of the molded concrete. For example, the letter G represents a mold board having its molding surfaces on two levels: H, I, with an intermediate, vertical, or right angled surface J. It will be necessary to bend the rod D not only at the point E, but also at the point F, in order to have said rod lie parallel to the surfaces H and I. In order, therefore, to give the correct angle to the part K which extends between the two bends E, F, I prefer to use stops or guide plates 8, the lower ends 9 of which will contact with and rest upon the surface I in the act of bending the rod D, thus preventing said rod from approaching the surface I closer than the predetermined distance desired. This distance is governed by the distance which these guide plates 8 extend below the rod D when the tool A is applied to the rod.

These guide plates are secured to the fulcrum member 6, preferably adjustably, in the following manner: A plurality of holes 9 are made in the member 6 and a plurality of corresponding holes 10 made in the plates 8. Bolts 11 provided on one end with heads 12 and at the other end with locking nuts 13, are placed through the holes 9 and 10. It is manifest that by this means the plates 8 may be secured to the member 6 in such manner as to have their lower ends 14 project to any desired distance.

Referring now particularly to the modified form as shown in Figs. 4 and 5, I point out that the shank member 1, in this modification, is made up of two parts hinged together. To the upper part of the shank, I have applied the numeral 1, as in the other figures, and to the lower part to which the extension 2 is united, I have applied the numeral 15. Any convenient form of hinge connection may be used between the shank 1 and its lower member 15, that will permit the latter to swing upon the former,—as for example, the tongue and groove arrangement 16 and pivot bolt 17. Through the swinging member 15, I provide a plurality of apertures 18. 19 is a link provided at one end with a pair of apertured connecting lugs 20 by which the link 19 may be pivotally secured by a screw bolt 21 to the fulcrum member 6. A similar pair of apertured arms or lugs 22 are provided on the other end of the link 19, whereby the latter may be removably secured by the screw bolt 23 to the swinging member 15, said bolt 23 being inserted in any one of the apertures 18.

In Figs. 4 and 5 the bolt 23 is shown in full lines, as inserted in the lowermost apertures 18, while in Fig. 5, said bolt is shown in dotted lines, as secured to the uppermost aperture. In this latter arrangement the dotted lines of Fig. 5 also illustrate the extent of swing of the part 15 carrying at its lower end the extension 2 and the hook 3.

This adjustable arrangement of the hook 3 with respect to the lower end of the fulcrum rod 6 provides for variations in the character of the work to be performed by the tool A.

It will be understood, of course, that various modifications in the mechanical arrangements and details may be made in the tool A without departing from the spirit of the invention; as for example, the seat 5 of the hook 3 while shown as adapted to receive a round rod D, may, manifestly, be given any other desirable contour; and the same is true of the shape of the bearing surface 7 at the lower end of the fulcrum member 6. I therefore do not desire my invention to be limited to the precise details of construction shown and described, except as indicated in the claims appended hereto.

I claim as my invention:

1. A tool for bending rods comprising a lever member, a shank member extending at an angle thereto, a rod engaging hook member attached to the shank member, a fulcrum member integral with the lever member and projecting at an angle therefrom and at an angle from the shank member, and adjusting means on the fulcrum member.

2. A tool for bending rods comprising a lever member, a two part shank member, one part being integral with the lever and the other part hingedly secured to the first mentioned part, a rod engaging hook member secured to the movable part of the shank member, a fulcrum member integral with and extending at an angle from the lever member, and means for adjustably joining the fulcrum member and the movable shank member.

3. A tool for bending rods comprising a lever member, a two part shank member, one part being integral with the lever and the other part hingedly secured to the first mentioned part, a rod engaging hook member secured to the movable part of the shank member, a fulcrum member secured to and extending at an angle from the lever member, and means for adjustably joining the fulcrum member and the movable shank member, said means comprising a link pivoted to the fulcrum member, a plurality of holes in the said movable shank member and removable means for securing the link to the movable shank member.

4. A tool for bending rods comprising a lever member, a shank member provided on its lower end with a rod engaging hook member, a fulcrum member secured to the lever member and provided with a rod bearing surface on its lower end and guide plates on the fulcrum member, the lower ends of which project below said rod bearing surface and means for adjusting said plates on said fulcrum member.

5. A tool for bending rods comprising a lever member, a shank member provided on its lower end with a rod engaging hook member, a fulcrum member secured to the lever member and provided with a rod bearing surface on its lower end and guide plates on the fulcrum member, the lower ends of which project below said rod bearing surface, apertures through the said plates and the fulcrum members and a bolt or bolts in said apertures whereby the plates may be adjustably secured to said fulcrum member.

In testimony that I claim the foregoing as my invention, I affix my signature in the presence of two witnesses, this 1st day of November, A. D. 1919.

JOHN J. WALT.

Witnesses:
B. L. MacGregor,
Taylor E. Brown.